July 26, 1949.  J. G. LEE  2,477,461
ROTATING JET DEVICE FOR AIRFOILS
Filed July 29, 1943
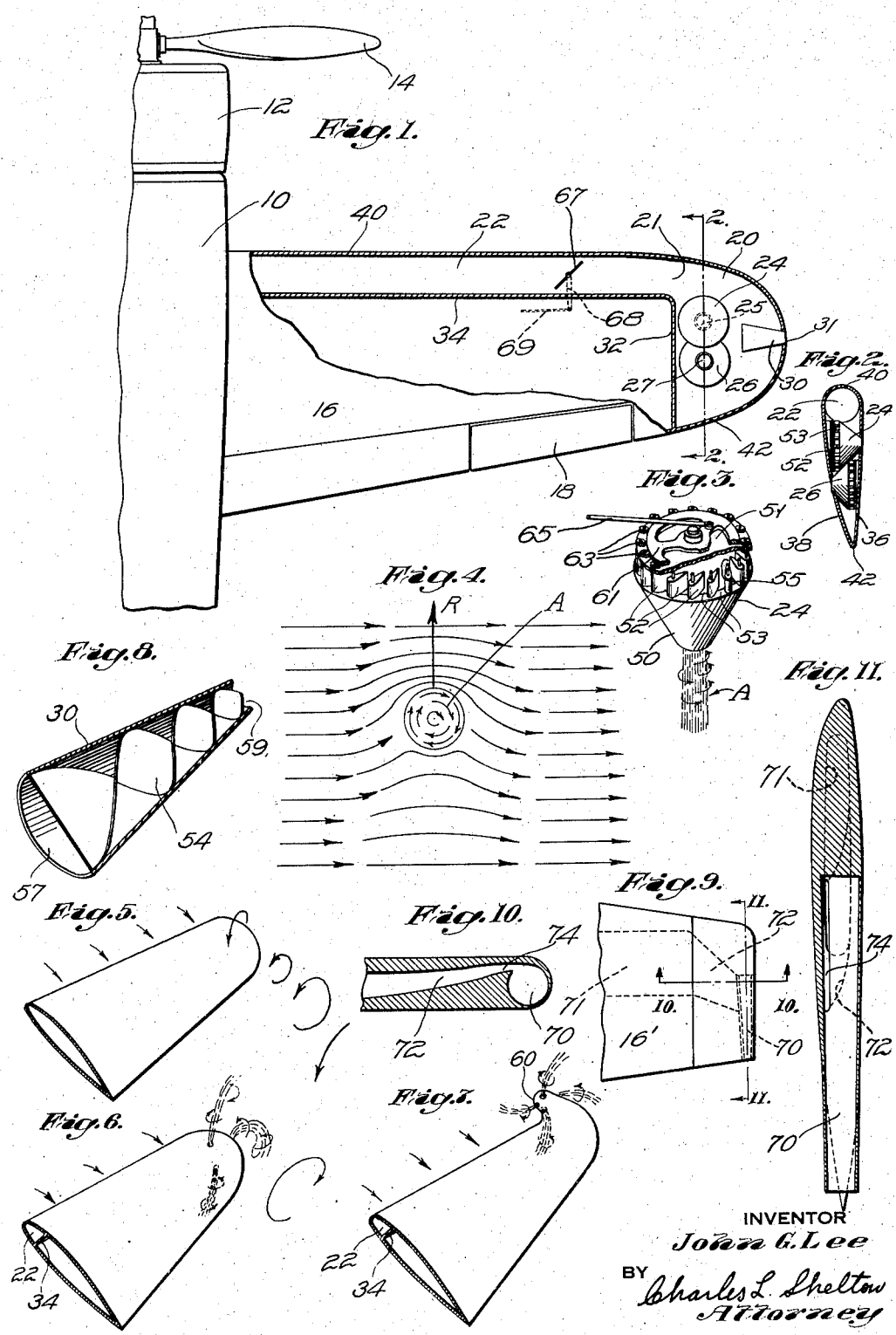
INVENTOR
John G. Lee
BY Charles L. Shelton
Attorney Patented July 26, 1949

2,477,461

UNITED STATES PATENT OFFICE 2,477,461

ROTATING JET DEVICE FOR AIRFOILS

John G. Lee, Farmington, Conn., assignor to United Aircraft Corporation, East Hartford, Conn., a corporation of Delaware Application July 29, 1943, Serial No. 496,553

9 Claims. (Cl. 244—40)

This invention relates to an apparatus and a method for reducing or increasing the effect of the tip vortices created by an airfoil having a velocity relative to an airstream passing thereover.

An object of this invention is to provide a lightweight and efficient means utilizing a rotating fluid jet for aiding or opposing the tendency of an airstream passing over the tip portion of an airfoil to whirl or rotate.

Other objects and advantages will be apparent from the specification and claims, and from the accompanying drawing which illustrates what is now considered to be a preferred embodiment of the invention.

Fig. 1 is a partial plan view, partly in section, showing in schematic form a right hand portion of an aircraft having an airfoil whose tip section is provided with means for projecting rotating fluid jets in various directions therefrom.

Fig. 2 is a right hand view, partly in section, along the line 2—2 of Fig. 1.

Fig. 3 is a perspective view, partly broken away, of one type of device for producing a rotating fluid jet.

Fig. 4 is a diagrammatic view showing the effect of an airstream on a fluid jet rotating about an axis transverse to the direction of movement of the airstream relative to the jet.

Fig. 5 is a schematic perspective view of vortices created in an airstream passing over the tip portion of a conventional airfoil.

Fig. 6 is a view similar to Fig. 5 but having rotating fluid jets directed outwardly (as in Fig. 1) in various directions from the airfoil tip and showing the direction in which said jets are deflected by the airstream, and in which they tend to rotate the airstream passing over the airfoil tip.

Fig. 7 is a view similar to Fig. 6, but with the jets increased in number and positioned forwardly of the leading edge of the airfoil.

Fig. 8 is a cut-away perspective view of a modification of the rotating jet forming device.

Fig. 9 is a plan view of a wing tip section having a nozzle arranged to discharge a rearwardly directed fluid jet which rotates about its own axis.

Fig. 10 is a section along the line 10—10 of Fig. 9.

Fig. 11 is an enlarged view along the line 11—11 of Fig. 9.

It is known that a whirl or vortex is caused by the flow of air from high to low pressure regions adjacent the tip portion of an airfoil, such as a wing, rotor blade, or propeller, when the airfoil is moved relative to the surrounding air. The creation of such vortices requires the expenditure of energy which shows up as induced drag, or resistance to the motion of the airfoil relative to the air.

According to this invention, rapidly rotating fluid jets, which may in some instances have a peripheral rotational velocity of several times the velocity of the airstream relative to the airfoil, are projected outwardly from an airfoil into the airstream flowing thereover, in a manner to either reduce or increase (depending upon the direction of rotation and direction of projection of fluid jets) the induced drag and other effects caused by the creation of tip vortices in the airstream passing over the airfoil.

Referring to the embodiment of the drawing, an airplane fuselage 10 having an engine (not shown) enclosed by cowl 12 and driving a propeller 14, is provided with a sustaining wing section 16 fixed to the fuselage at its inboard end, and which may be provided with a control surface such as an aileron 18. Wing 16 is formed to provide a pressure duct 22 preferably within its leading edge, the walls of this duct being constituted by the wing surfaces adjacent the leading edge 40 and a supporting spar 34 extending spanwise of the wing. The outboard free end or tip of the wing is formed as a closed pressure chamber 20 bounded by lower wing surface 36, upper wing surface 38, leading edge 40, trailing edge 42, and a chordwise extending rib 32. Rib or wall 32 has an opening 21 therein through which fluid under pressure is passed from duct 22 to chamber 20.

Within chamber 20 are a plurality of whirler nozzles, in this instance three nozzles 24, 26 and 30.

Two of these nozzles (24 and 26 in Fig. 1) are formed with a converging conical portion 50 (Fig. 3) having a discharge opening (25, in Fig. 1) at the small end thereof and closed at the other end by a wall 51. At the larger diameter end of converging nozzle 50 are a circumferential series of curved vanes or blades 52, between which are passages 53 each converging from a large inlet, open to the chamber side of the nozzle, to a small discharge opening 55 open to the interior of the nozzle.

The third nozzle 30 may be formed (Fig. 8) simply as a converging passage having a spiral baffle 54 therein which gradually increases in twist or decreases in pitch from the inlet opening 57 to the discharge opening 59. While the nozzles shown are converging only, converging-diverging Venturi nozzles may be preferable in some instances.

A fluid under pressure, such as compressed air from a compressor (not shown) within the fuselage 10, or a mixture of compressed air and engine exhaust gas, is forced through the duct 22 to the chamber 20. Various sources of pressure fluid may be used within the scope of this invention to supply the chamber 20 and the nozzles which discharge jets therefrom and therefore no specific source of pressure fluid has been shown. However, it is preferred that the fluid be compressed atmospheric air, which may be engine cooling air mixed with the products of combustion from the aircraft propelling engine. Such fluid contains energy in the form of heat from the engine, which may be at least partially utilized in forming the rotating fluid jets of this invention. By leading the compressed fluid, which is heated by the process of compression or by the introduction of hot engine exhaust gas thereinto, through the interior of the leading edge portion of the wing the heat from the fluid may also be utilized to de-ice the wing, or airfoil, through which it passes.

The pressure of the fluid within chamber 20 is maintained higher than the pressure of the air surrounding the wing and consequently the pressure fluid within chamber 20 will flow through the nozzles 24, 26, and 30 to the lower pressure area surrounding the exterior of the airfoil. As the pressure fluid passes through the nozzles a portion of its pressure energy is changed to velocity, and it issues from the discharge openings 25, 27, 31 in the form of a jet having a high velocity. The jet is also given a rotative velocity component, or whirl, as it passes through the vanes 52 or the initial flights of spiral baffle 54. This velocity of rotation about the axis of the nozzle or jet imparts an angular momentum to the fluid which, as the cross-sectional area of the stream decreases, results in a continually increasing velocity of rotation of the jet as it passes through the converging nozzle. Thus the jets issuing from the discharge openings 25, 27, and 31 rapidly whirl or rotate about their own axes, as shown at A in Fig. 3. The velocity of each jet both around and along its axis may be varied by varying the pressure of the fluid in chamber 20 in relation to the pressure of the airstream passing over the chamber. For instance, this might be done by a throttle valve 67 in duct 22 of Fig. 1. The position of throttle 67 may be varied by shifting rod 69 attached to the throttle by arm 68, thus providing a control for varying the effect of or for selectively applying the jets. By varying the design or the angle of vanes 52 the rotative velocity component of the jet A may be varied in relation to the linear velocity thereof. Vanes 52 may be made adjustable, as by pivoting them at a point intermediate their length, for changing their position so as to vary the direction of passages 53, relative to the axis of the nozzle and consequently the rotative component of jets A, while the aircraft is in flight. In Fig. 3, pivoted vanes 52 may be adjusted so as to alter the rotative velocity of jet A by shifting rod 65 so as to turn gear 61. As gear 61 is rotated, the pinion gears 63 meshing therewith and carried by the vane pivots will be rotated to alter the angular position of the vanes. By this means the velocity or direction of rotation of jet A may be varied or reversed as desired.

Fig. 4 shows the effect of an airstream passing over a rotating object placed therein, such as the jet A rotating about an axis transverse to the direction of movement of the air stream. The resulting velocity of the main stream will be greater on one side of the jet and less on the other side thereof. This will cause a relative pressure difference between the two sides of the rotating jet, which is called the Magnus effect, and which will create a force tending to move the jet transversely of the airstream, as indicated by the arrow R in Fig. 4, toward the side having the higher resulting velocity.

Thus, when the whirlers or nozzles 24, 26 and 30 are arranged to rotate the jets issuing therefrom about their own axes, in the directions shown in Fig. 6, the airstream passing over the wing will tend to deflect the jets, and a portion of the airstream therewith, circularly or spirally in a manner to counteract or oppose the tip vortex normally present in an airstream passing over a wing tip as shown in Fig. 5. The whirling or revolving jets of this invention may therefore be used to oppose the formation or decrease the magnitude of tip vortices and thereby eliminate or reduce the deleterious effects thereof.

Conversely, if the nozzles are adjusted (Fig. 3) to rotate and revolve the jets in directions respectively opposite to those shown in Fig. 6, the jets and a portion of the airstream carried therewith will be deflected in the same direction as the tip vortex as shown in Fig. 5, and will therefore tend to augment same. By such means the magnitude of the tip vortices may be increased, and the whirling jets may therefore be used as a means to increase the drag of the aircraft, or as an aerodynamic brake.

The wing tip may be provided with a forwardly projecting portion from which the rotating jets are discharged into the airstream. Four such jets are shown discharging from the projection 60 in Fig. 7.

Backwardly or forwardly pointing jets, rotating about an axis extending generally in the direction of the axis of the normal tip vortex, may also be used. Thus, in Figs. 9, 10, and 11, a nozzle 70 preferably tapered, is arranged to discharge a fluid jet backwardly relative to the motion of the airstream over airfoil 16'. Fluid under pressure is supplied to nozzle 70 by a duct 71 and a tapering passage 72 which opens tangentially at 74 into the larger diameter end of nozzle 70. The angular momentum imparted to the fluid stream as it enters nozzle 70 tangentially results in a continuous increase in rotational velocity of the fluid as it passes through the tapering nozzle, from which it issues as a fluid jet having a linear velocity relative to the airfoil 16' along an axis extending generally in the direction of motion of the airfoil relative to the airstream and having a rotational velocity about said axis. The angular momentum imparted to the jet may (as in Figs. 10, 11) be in a direction to revolve the jet to oppose the rotation of the tip vortex, to decrease its effect; or the jet may revolve in the same direction as the tip vortex, so as to increase its effect. Adjustable means for controlling the velocity and direction of jet rotation, such as shown in Fig. 3, may be also used in connection with the modification of Figs. 9, 10, and 11.

As referred to herein the word revolve differs from the word rotate and is used to indicate movement about a center as denoting for example that the earth rotates on its axis and revolves about the sun.

It is to be understood that the invention is not limited to the specific embodiment herein illustrated and described, but may be used in other ways without departure from its spirit as defined by the following claims.

I claim:

1. In an aircraft, a lift producing airfoil having a source of fluid pressure therein, and means for controlling the drag caused by the flow of air around the tip from beneath said airfoil to the low pressure area above the airfoil including a nozzle carried by said tip receiving fluid from said source and discharging externally of said airfoil and baffle means in the fluid stream passing through said nozzle for imparting a revolving movement to the jet issuing from said nozzle.

2. In an aircraft, a wing having a tip portion, a source of fluid pressure therein, and means for reducing the drag caused by the trailing wing tip vortex including a wing tip nozzle receiving fluid from said source and discharging said fluid as a jet directed transversely to the direction of the air stream passing over said tip portion and baffle means in the fluid stream passing through said nozzle for imparting a rotary movement to the fluid within said jet whereby aerodynamic forces act on said jet to bodily gyrate the jet in opposition to said wing tip vortex.

3. In an aircraft, a wing having a tip portion, a source of fluid pressure therein, and means for reducing the drag caused by the natural wing tip vortex including a plurality of nozzles communicating with said pressure source and discharging externally of said wing and transversely to the direction of the airstream passing over said tip portion and means in the fluid stream passing through said nozzles for imparting rotational movement to the fluid whereby aerodynamic forces act thereon to induce a vortex movement to the jets issuing from said nozzles, said nozzles being disposed adjacent said wing tip portion so that the vortex movement of the jets opposes said wing tip vortex.

4. In an aircraft, a wing having a wing tip chamber, means for introducing fluid under pressure into said chamber, and means for controlling the drag caused by the flow of air around the wing tip from beneath the wing to the low pressure area above the latter including a nozzle carried by the upper surface of the wing tip, said nozzle receiving fluid from said chamber and discharging upwardly from said wing tip surface and baffle means acting on the fluid stream discharged from said chamber for imparting a revolving movement to the jet issuing from said nozzle, and means for controlling said baffle means to reverse the direction of revolving movement of said jet about the nozzle axis.

5. In an aircraft, a wing, a tip portion having a chamber therein, a projection extending forwardly of the leading edge of said tip portion, means for introducing a fluid under pressure into said chamber, means for controlling the drag caused by the natural vortex trailing from said wing tip including wing tip nozzles receiving fluid from said chamber and located on the upper and lower surfaces of said projection and discharging said fluid as jets above and below said surfaces in directions substantially normal to the direction of the air flowing past said wing and baffle means for imparting revolving movement to said jets issuing from said nozzles, and manually operative means for controlling said baffle means to effect opposite revolving movement of the fluid in said jets.

6. In an aircraft, a wing having a source of fluid pressure therein, means for controlling the drag caused by the vortex trailing from said wing tip including wing tip nozzles receiving fluid from said source and located on the upper and lower surfaces of said wing and discharging above and below said surfaces substantially normal to the direction of the air flowing past said wing and baffle means for imparting rotary movement to the jets issuing from said nozzles and arranged to effect opposite revolving movement of said jets about the axes of said nozzles, and manually operable means for reversing the pitch of said baffles to reverse the revolving movement of said jets about said nozzle axes.

7. In an aircraft, a wing having a source of fluid pressure therein, and means for controlling the drag caused by the flow of air around the wing tip from beneath the wing to the low pressure area above the latter including a wing tip nozzle receiving fluid from said source and discharging said fluid as a jet laterally from said wing tip and baffle means for imparting revolving movement to said jet issuing from said nozzle.

8. In an aircraft, a wing having a source of fluid pressure therein, and means for controlling the drag caused by the natural vortex movement of air flowing around the wing tip from beneath the wing to the low pressure area above the latter including a wing tip nozzle receiving fluid from said source and discharging said fluid as a jet rearwardly from the trailing edge of said wing and baffle means between said pressure source and the discharge end of said nozzle for imparting a revolving movement to the jet issuing therefrom in opposition to said natural vortex movement.

9. In an apparatus for controlling the natural vortex in an air stream passing over the tip portion of an airfoil, a source of fluid under pressure, a nozzle communicating with said pressure source and discharging fluid as a jet into said air stream in a direction substantially normal to the direction of the air stream flowing past said tip portion, and means to produce a deflection of said jet and a portion of said air stream in a predetermined direction relative to the direction of rotation of said natural vortex including baffle means for imparting a revolving movement to said jet about its own axis.

JOHN G. LEE.

REFERENCES CITED

The following references are of record in the file of this patent:

UNITED STATES PATENTS

| Number | Name | Date |
|---|---|---|
| 1,493,753 | Koleroff | May 13, 1924 |
| 1,580,577 | Baumann | Apr. 13, 1926 |
| 2,048,847 | Desmet | July 28, 1936 |
| 2,075,817 | Loerke | Apr. 6, 1937 |

FOREIGN PATENTS

| Number | Country | Date |
|---|---|---|
| 443,116 | Germany | Apr. 14, 1927 |